United States Patent [19]

Jones

[11] 4,116,664
[45] Sep. 26, 1978

[54] FERTILIZER COMPOSITION AND METHOD OF MAKING SAME

[76] Inventor: Leon R. Jones, P.O. Box 597, Chandler, Ariz. 85224

[21] Appl. No.: 803,435

[22] Filed: Jun. 6, 1977

Related U.S. Application Data

[63] Continuation-in-part of Ser. No. 738,888, Nov. 4, 1976, abandoned, which is a continuation-in-part of Ser. No. 670,240, Mar. 25, 1976, abandoned.

[51] Int. Cl.² ............................................. C05B 15/00
[52] U.S. Cl. ......................................... 71/29; 71/30; 71/63; 260/555 S
[58] Field of Search .................... 71/28, 29, 30, 34, 63, 71/64 SC, 64 C; 260/555 S, 555 R

[56] References Cited

U.S. PATENT DOCUMENTS

| | | | |
|---|---|---|---|
| 3,330,864 | 7/1967 | Bellinger | 260/555 R |
| 3,640,698 | 2/1972 | Backlund | 71/29 |
| 3,796,559 | 3/1974 | Windgassen | 71/64 C |

OTHER PUBLICATIONS

Chem. Abstr., vol. 8, 1914, p. 2346, DuToit.
Fertilizer Technology and Use; Dinauer, 1971, pp. 355-357, 364-367.

*Primary Examiner*—Ferris H. Lander
*Attorney, Agent, or Firm*—Herbert E. Haynes, Jr.

[57] ABSTRACT

A method for controlled reaction of urea with sulfuric acid to form a liquid nitrogen sulfate fertilizer composition consisting of urea sulfate and liquified urea, and which may include other nutrients.

30 Claims, 1 Drawing Figure

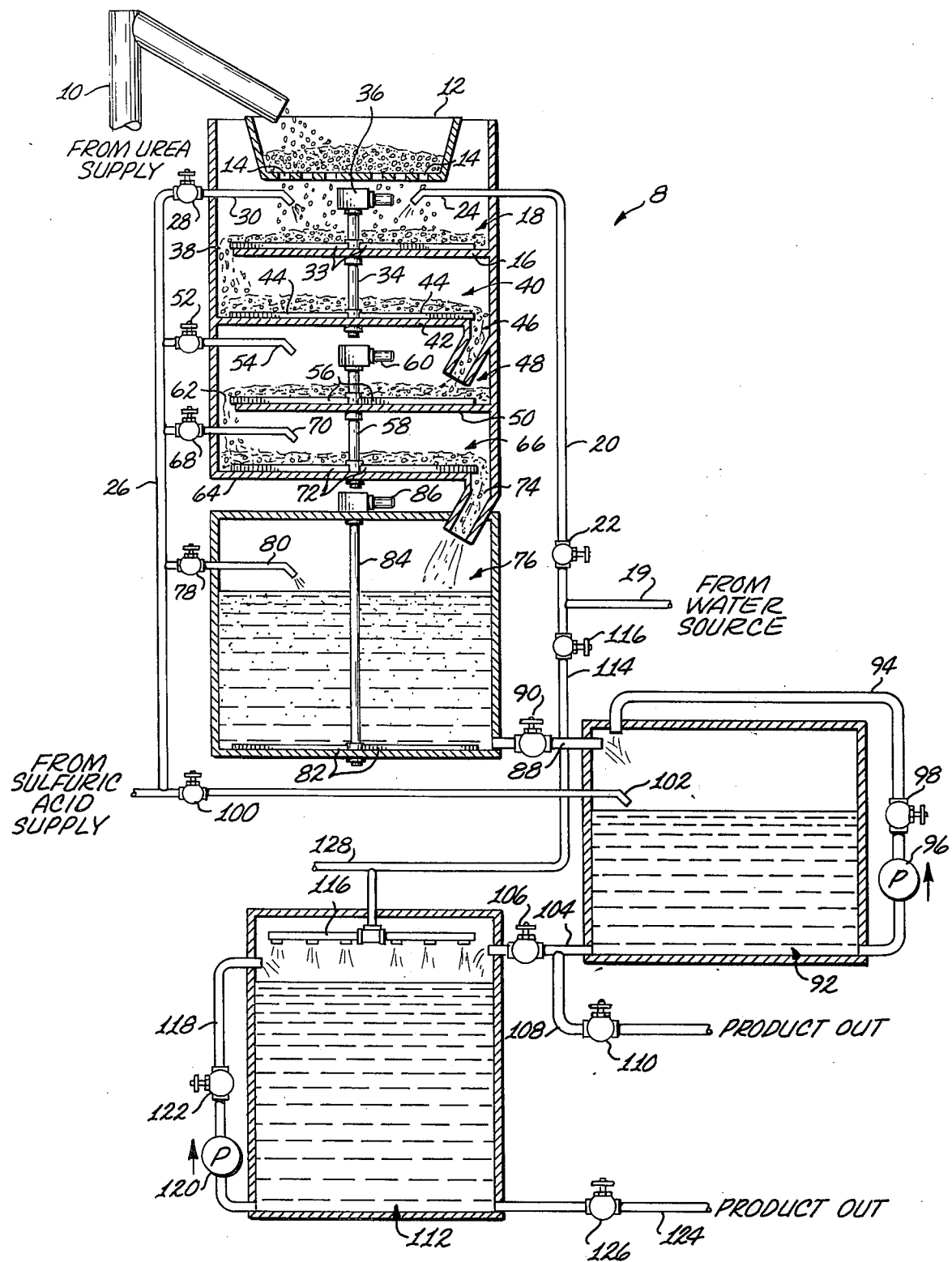

FERTILIZER COMPOSITION AND METHOD OF MAKING SAME

CROSS REFERENCE TO RELATED APPLICATIONS

This application is a continuation-in-part of copending U.S. patent application Ser. No. 738,888, filed Nov. 4, 1976, now abandoned for: FERTILIZER COMPOSITION, METHOD FOR TREATING ALKALINE SOILS THEREWITH, AND APPARATUS AND METHOD FOR MAKING SAID COMPOSITION, with that application in turn being a continuation-in-part of a copending U.S. patent application, now abandoned, Ser. No. 670,240, filed Mar. 25, 1976, for: METHOD FOR TREATING ALKALINE SOILS, all by the same inventor.

BACKGROUND OF THE INVENTION

1. Field of the Invention

This invention relates to fertilizers and more particularly to liquid nitrogen sulfur fertilizer composition and method of making same.

2. Brief Description of the Prior Art

The application of nitrogenous fertilizers has long been used as a soil amendment by the farming industry and other, with such fertilizers being applied in either a powdered form such as by broadcasting, or in a liquid form by introduction into the water supply.

Also, the application of sulfuric acid improves soil structure by the defloculation of sand and clay soil particles. This is accomplished through formation of the sulfates of the alkali metals in the soil. As a result of this defloculation of soil particles, the soil water uptake and retention is improved. This in turn leads to higher crop yields with lower water requirements, and on a long term basis, conservation of water resources.

Application of sulfuric acid directly to the soil has given excellent results on high sodium and high salt soil when applied at rates of from one to three tons per acre. However, sulfuric acid is somewhat dangerous and difficult to handle and it requires specialized personnel and equipment to apply.

Thus, it is a common practice to apply nitrogenous fertilizers and sulfuric acid to soils, and in particular to alkaline soils. According to prior art techniques, the nitrogenous fertilizer is applied in one step, and a separate second step is employed to apply the sulfuric acid.

The above described two step method has several disadvantages. To begin with, it is simply more expensive to treat the soil in two different steps as compared to a single step treatment. There are safety hazards associated with the handling of sulfuric acid which would be desirable to avoid or minimize.

Generally speaking, liquid fertilizers are well known in the art; however, none of these existing liquid fertilizers employ sulfuric acid in the formulation thereof or are available in nitrogen-sulfate concentrations comparable with the products of the present invention.

The existence of urea-sulfate is also known; however, in its pure form it is a solid having 17.72% nitrogen by weight, and is inherently soluble in water which, of course, reduces the percent of nitrogen by weight when dissolved in water. To the best of my knowledge, no liquid fertilizer product exists which has liquid urea-sulfate therein and which contains 17.72% nitrogen by weight or more.

SUMMARY OF THE INVENTION

In accordance with the present invention, a new and useful composition of matter and method of making same is disclosed, with the composition being a liquid nitrogen-sulfate fertilizer consisting of urea sulfate and liquified urea.

The liquid fertilizer composition of the present invention is relatively inexpensive to manufacture, is non-toxic, non-caustic, and non-corrosive to black iron which allows it to be safely transported, handled, stored, and applied by utilization of ordinary farm workers and ordinary application equipment which results in considerable cost reductions.

Additionally, the liquid fertilizer composition provides both the necessary nitrogen and sulfur amendments and simultaneously adjusts the soil pH. Thus, the addition of the fertilizer components and adjustment of soil pH can be accomplished in a single step rather than the multi-step methods of the prior art.

In the preferred form, the liquid fertilizer composition includes blended urea sulfate and liquified urea and may be formulated with a nitrogen content of up to about 37% by weight and sulfur content of up to about 15% by weight and may include additional sulfuric acid to raise the sulfur content and may also be formulated to include other nutrients such as phosphorous, iron and zinc.

In accordance with the method of the present invention, sulfuric acid is gradually added to urea, which is preferrably in powdered or prilled form, in carefully controlled amounts which are calculated to hold the temperature produced by the resulting reaction within prescribed limits. The sulfuric acid and urea form a reacting molten slurry which is slowly blended during the reaction period and sulfuric acid is gradually added until the total desired amount has been added, and the blending is continued until the slurry has become completely liquified. In the preferred form, water is added in precisely controlled amounts to produce desired products which will remain in liquid form at normal ambient temperatures.

Accordingly, it is an object of the present invention to provide a new and useful liquid fertilizer composition.

Another object of the present invention is to provide a new and useful liquid fertilizer composition by which nitrogen and sulfur amendments may be simultaneously applied to soil.

Another object of the present invention is to provide a new and useful liquid fertilizer composition by which nitrogen and sulfur amendments may be simultaneously applied to soils, and which will adjust soil pH.

Another object of the present invention is to provide a new and useful homogenous liquid fertilizer composition comprising urea sulfate and liquified urea.

Another object of the present invention is to provide a new and useful homogenous liquid fertilizer composition comprising urea sulfate, liquified urea, and other nutrients.

Another object of the present invention is to provide a new and useful liquid fertilizer composition of the above described character which is relatively inexpensive to manufacture, and is easily and safely handled, transported, store, and applied.

Still another object of the present invention is to provide a method by which sulfuric acid and urea are combined to form a homogenous liquid nitrogen sulfate fertilizer.

The foregoing and other objects of the present invention, as well as the invention itself, may be more fully understood from the following description when read in conjunction with the accompanying drawing.

BRIEF DESCRIPTION OF THE DRAWING

The sole FIGURE of drawing is a schematic illustration of an apparatus suitable for carrying out the method of the present invention.

DESCRIPTION OF THE PREFERRED EMBODIMENTS

Referring more particularly to the drawing which illustrates an apparatus indicated generally by the reference numeral 8, which facilitates the process of formulating the liquid fertilizer composition of the present invention.

Urea, preferrably in prilled or powdered form, is brought by suitable means (not shown) to an elevator 10 which deposits the urea into a urea drop or hopper 12 suitably mounted atop the apparatus 8. The hopper 12 has a plurality of relatively large discharge ports 14 provided in the bottom thereof so that the urea will fall from the hopper and will be distributed on the surface of a floor plate 16 of a first stage reactor 18.

Water from a suitable supply line 19 is directed through a pipeline 20 having a flow control shutoff valve 22 therein to a spray nozzle 24 located above the floor plate 16 so that the urea on the floor plate 16 may be wetted down with a water spray. The addition of water at this point is not critical in the method of the present invention, but the inclusion of that step is preferred for dust control purposes and to initiate the reaction to be accomplished in the apparatus 8. If water is added to the urea in the first stage reactor 18, the amount added must not be excessive so that the temperature of the resulting reaction will be maintained within specific limits, as will hereinafter be described. Thus the amount of water added at this point will only be enough to dampen or moisten the urea.

Sulfuric acid from a suitable supply is directed through a manifold pipeline 26, through a flow control shutoff valve 28 to a spray nozzle 30 located above the floor plate 16 of the first reactor 18 so that a predetermined quantity of a total desired amount of sulfuric acid is added at that location. As will hereinafter be described in detail, the sulfuric acid is added in controlled quantities at various locations in the apparatus 8 for temperature control purposes.

The urea and sulfuric acid on the floor plate 16 of the first reactor 18 is slowly blended such as by sweep arms 32 which are affixed for rotation with shaft 34 which is driven by a suitable motor 36. Slow rotation of the sweep arm 32 will blend the urea, sulfuric acid, and water (if any) and will gradually move some of that material to an outlet 38 formed in the floor plate 16 at the left side thereof.

The urea, sulfuric acid and water (if any) will commence a reaction in the first reactor 18, and that reaction, which will hereinafter be described, is allowed to continue in a second reactor 40 located immediately below the first reactor 18. The reacting material falling from the outlet 38 of the floor plate 16 will land on a floor plate 42 of the second reactor 40 where it is slowly blended such as by sweep arms 44 mounted fast for rotation with the shaft 34. The reacting material on the floor plate 42 is blended by the sweep arms 44 which assists the inherent reaction of urea and sulfuric acid so that the reacting material becomes a molten slurry, and the slurry is gradually moved to an outlet 46 formed in the floor plate 42 at the right side thereof.

A third reactor 48 is located immediately below the second reactor 40, and has a floor plate 50 for receiving the molten slurry falling from the outlet 46 of the second reactor 40. An additional amount of the sulfuric acid is added to the molten slurry on the floor plate 50, with that sulfuric acid being supplied from the manifold pipeline 26 through a flow control valve 52 and an acid spray nozzle 54.

The molten slurry and newly added sulfuric acid is slowly blended in the third reactor 48 such as by sweep arms 56 which are affixed for rotation with shaft 58 which is driven by a suitable motor 60. In addition to the blending action imparted by the sweep arms 56, the molten slurry is gradually moved thereby to an outlet 62 formed in the floor plate 50 at the left side thereof. The molten slurry emerging from the outlet 62 of the third reactor 48 will fall onto the floor plate 64 of a fourth stage reactor 66. Another predetermined amount of sulfuric acid is added to the molten slurry on the floor plate 64 of the fourth reactor 66, with that acid being supplied from the manifold pipeline 26 through a flow control valve 68 to an acid spray nozzle 70. Slow blending of the molten slurry is continued in the fourth reactor 66 such as by sweep arms 72 affixed for rotation with the shaft 58, and that molten slurry will emerge from the reactor 66, due to the pushing action of the arms 72, through an outlet 74 formed at the right side of the floor plate 64.

The reaction of urea and sulfuric acid formed a molten slurry as described above, and that molten slurry gradually becomes more liquified as it progresses tortuously through the reactors 18, 40, 48 and 66 of the apparatus 8. The through-put rate of the reacting slurry is calculated so that the slurry emerging from the fourth reactor 66 will be mostly, if not all, in liquid form when it enters the fifth reactor 76.

The fifth reactor 76 is in the form of a tank for containing the liquified slurry. Another additional amount of sulfuric acid is added to the substantially liquified slurry in the fifth reactor 76, with that amount of acid being supplied from the manifold 26 through a flow control valve 78, and through an acid spray nozzle 80. The substantially liquified slurry is blended in the fifth reactor 76 such as by the sweep arms 82 affixed for rotation with a shaft 84 that is driven by a suitable motor 86. Blending of the slurry within the fifth reactor 76 is accomplished for continuation of the reaction and to insure that complete liquification of the slurry occurs.

The liquified slurry is removed from the fifth reactor 76 through a pipeline 88 having a flow control valve 90 therein, and is deposited is a sixth reactor 92. The sixth reactor 92, also in tank form, is provided with a circulation line 94, having a suitable pump 96 and flow rate control valve 98 therein and which communicates between the bottom of reactor 92 and the top thereof. The liquified slurry is circulated by means of the circulation line 94 which further blends the liquified slurry and a final amount of sulfuric acid which is added thereto from the supply of acid through a flow control valve 100 and acid spray nozzle 102.

After a predetermined time within the sixth reactor 92, the liquified product may be removed for transport to a remote location for further processing as will hereinafter be described in detail. To accomplish such removal, the sixth reactor 92 has an outlet pipeline 104 at the lower end thereof, with the pipeline 104 having a flow control/shutoff valve 106 therein. The pipeline 104 is further provided with a branch pipeline 108 connected thereto upstream of the valve 106. The branch pipeline is also provided with a flow control/shutoff valve 110 therein. Removal of the product from the sixth reactor 92 is accomplished by closing of the valve 106 and opening of the valve 110 which allows the liquid product from the sixth reactor 92 to flow from the pipeline 104 into the branch pipeline 108, and subsequently to a suitable transporting vehicle (not shown).

The liquid product removed from the sixth stage reactor 92 is a relatively unstable product and requires special handling and further processing as will be described. Therefore, it is preferred that the product exiting from the sixth reactor 92 be directed through pipeline 104, valve 106, (with valve 110 closed) into stabilization reactor 112. The stabilization reactor 112 is in the form of a tank for containing the product, and is provided with means for adding a controlled amount of water to the product. Water from the supply line 19 is directed through a pipeline 114 having a flow control-shutoff valve 116 therein, to a spray nozzle manifold 116 located in the upper portion of the reactor 112. The stabilization reactor 112 is also provided with a circulation line 118 in which a suitable pump 120 and flow control valve 122 are provided. The circulation line 118 circulates the product to accomplish blending of the product and the water added thereto and to accomplish the reaction therebetween.

Removal of the desired stabilized product from the stabilization reactor 112 is accomplished by a pipeline 124 located at the lower end thereof, and in which a flow control valve 126 is provided.

As will hereinafter be described, additional nutrients, such as phosphorous, iron and zinc may be added to the product in the stabilization reactor 112 if desired, with those nutrients being added through the spray nozzle 116 from input line 128.

The reaction which occurs within the apparatus 8 is exothermic and will liberate great quantities of heat. Therefore, the rate at which the sulfuric acid and water are added is critical in the method of the present invention. When the initial step of adding water to the urea is employed in the present method, and with a predetermined amount of sulfuric acid being simultaneously added, the quantities and addition rate must be controlled so that the resulting heat is in the range of from approximately 100° F. to 225° F.. The subsequently added acid and water must also be carefully controlled to maintain the reaction temperature in that range throughout passage of the product constituents through the apparatus 8.

The quantity of sulfuric acid added to the urea must be sufficient to produce enough heat to change the urea from its solid state to a molten state, and to properly start the reaction to form liquified molten urea sulfate. The molten state begins to be achieved when the temperature is in the vicinity of 100° F. to 125° F., and when the molten state is arrived at, the reaction which forms liquified urea sulfate and liquified urea begins to occur. In other words, if the sulfuric acid is added at to slow a rate and the resulting temperature is below say 100° F., the molten state will NOT be achieved and proper reaction of the sulfuric acid and urea will not occur, i.e., liquification will not occur. If the sulfuric acid is added at a rate which is too fast and the temperature goes above say 200° F. to 225° F., a gas will be emitted and this causes changes in the characteristics of the end product, such as solidification thereof.

It has been determined by experimentation that the minimum temperature is about 100° F. and the maximum temperature is about 225° F., with the ideal temperatures being in the range of from 160° F. to 200° F.

When the reaction temperature is maintained within the above described limits, the reaction will occur when the sulfuric acid and urea begin to become molten. The reaction will cause the formation of liquified urea sulfate and liquified urea which form a homogenous fused composition.

The above described reaction proceeds as follows:

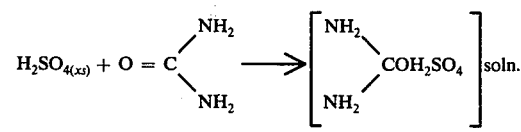

As previously described, the end product is a homogenous fused solution of urea sulfate and liquified urea with the organic nitrogen being derived from urea and the sulfur in sulfate form being derived from the sulfuric acid.

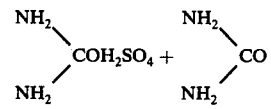

The proportions of urea and sulfuric acid employed in the method of the present invention may, of course, be varied with the resulting products varying in accordance with the proportions. The proportions may be varied to produce preferred products having a total nitrogen content in the range of from about 1% to 37%, and having a total sulfur content in the range of from 1% to 15%. Further, the liquid fertilizer products of the present invention will always have a pH in the range of approximately 0.4 to 1.0 thus making it ideal for treatment of alkaline soils.

As is customary in the fertilizer art, particular products are identified by a standard nitrogen analysis notation, which denotes the ratios of nitrogen, phosphorous and potash and in some instances denotes sulfur. For example, a particular product having a nitrogen analysis of 30-0-0-10 will have 30% nitrogen and 10% sulfur.

As hereinbefore mentioned, the particular products removed from the sixth reactor 92 may be employed in that state. However, such products are subject to solidification upon cooling from the molten state. The temperature at which solidification occurs is dependent upon the particular product produced. For example, a particular product having a nitrogen sulfur analysis of 31-0-0-9.7 will begin to solidify at a temperature of about 60° F.

Therefore, a product such as that given in the above example, may be employed in that state provided that it is kept above the solidification temperature. It will be noted that the products formulated in accordance with the method of the present invention as described above are extremely soluble in water, and once dissolved in water will not solidify at normal ambient temperatures.

Thus, the product of the above example may be transported hot to a storage facility and added to a predetermined amount of water to achieve a desired analysis and storage characteristics.

An alternative to the transporting of the hot product is partial dissolution of the product prior to a removing it from the apparatus 8. Again, by way of example, that same particular product having a nitrogen sulfur analysis of 31-0-0-9.7 may have approximately 5% by weight of water added thereto which will alter the nitrogen sulfur analysis to 29-0-0-9, which is a product that will maintain its liquid form at temperatures of about 10° F. and above.

Such partial dissolution of products is accomplished in the stabilization reactor 112 of the apparatus 8 as previously described.

Due to the cost of shipping and handling, the amount of water added to the stabilization reactor 112 is carefully calculated and controlled, with that amount being determined by: the desired product, i.e., nitrogen-sulfur analysis, and the temperature that the product must be able to withstand without solidifying.

For example, if the desired product is to have a nitrogen-sulfur analysis of 29-0-0-9 and must remain in liuqid form at temperatures as low as 10° F., the following proportions of urea, sulfuric acid and water are used to produce 100 pounds of that product. 63.1 pounds of urea reacted, in accordance with the method of the present invention, with 29.7 pounds of 93% sulfuric acid in the absence of water, will result in a product having a nitrogen-sulfur analysis of 31-0-0-9.7, and such a product will begin to solidify at about 60° F. The addition of 7.2 pounds of water will alter the 31-0-0-9.7 product to 29-0-0-9, and that product will remain in liquid form at temperatures of approximately 10° F. and above.

From the above, it will be realized that many variations in the amounts of urea, sulfuric acid and water may be employed and the following is given as an aid in determination of the proportions needed to produce desired products.

Given:
Urea = 46% nitrogen
93% $H_2SO_4$ = 30.36% sulfur
A desired product having an analysis of X-O-O-Y is calculated as follows:
X/0.46 = percentage of urea
Y/0.3036 = percentage of 93% $H_2SO_4$
100% − (X+Y) = percentage of $H_2O$
Example: a product having an analysis of 29-O-O-9 is calculated as follows:
(29/0.46) = 63.05% urea
(9/0.3036) = 29.7% 93% $H_2SO_4$
100% − (63.05% + 29.7%) = 7.25% $H_2O$
Therefore, to formulate 100 lbs. of the product having the analysis of 29-O-O-9 requires the following approximate proportions:
63.1 lbs. of urea
29.7 lbs. of 93% $H_2SO_4$
7.2 lbs. of $H_2O$ The following further examples are presented for completeness of this disclosure and to further illustrate the practice of the invention and are not to be construed as limitations of the invention.

EXAMPLE 1

Preparation of 90 pounds of a product having a nitrogen-sulfur analysis of 26-O-O-11 is accomplished in accordance with the method of the present invention by employing 56.7 lbs. of urea, 36.8 lbs. of 93% sulfuric acid and 6.5 lbs. of water.

This product is non-caustic and thus can be easily handled by unskilled workers without protective clothing and without the great danger of burns encountered with the handling of sulfuric acid. Thus, a relatively low cost nitrogen sulfur solution, safe to handle and with advantageous nutritive and soil conditioning properties, is achieved.

EXAMPLES 2-8

It has been determined through experimentation that when the liquid fertilizer composition of the present invention is formulated in certain ratios, optimum handling, application, and other characteristics result. Examples of such ideally marketable products are shown below:

| Example | Analysis | % Urea | %-93% $H_2SO_4$ | % $H_2O$ | Solidification Temp. °F |
|---|---|---|---|---|---|
| #2 | 28-0-0-8 | 61 | 27 | 12 | 5° |
| #3 | 29-0-0-9 | 63.1 | 29.7 | 7.2 | 10° |
| #4 | 30-0-0-8 | 65.5 | 27 | 7.5 | 40° |
| #5 | 28-0-0-10 | 61 | 33 | 6 | 50° |
| #6 | 26-0-0-11 | 59 | 36.5 | 4.5 | 60° |
| #7 | 30-0-0-10 | 65.5 | 33 | 1.5 | 60° |
| #8 | 32-0-0-9 | 69.6 | 30 | .4 | 90° |

EXAMPLES 9-14

Additional sulfuric acid may be added to the product solution of Example 1, such as by addition of the acid into the sixth reactor 92, in the ratios indicated below and the resulting solutions have the indicated analyses:

| Example | Quantity of 26-0-0-11 Solution (pounds) | Quantity of 93% Sulfuric Acids (pounds) | Analysis |
|---|---|---|---|
| #9 | 81 | 19 | 21-0-0-14 |
| #10 | 70 | 30 | 18-0-0-16 |
| #11 | 60 | 40 | 15-0-0-18 |
| #12 | 50 | 50 | 13-0-0-20 |
| #13 | 31 | 69 | 8-0-0-24 |
| #14 | 20 | 80 | 5-0-0-26 |

EXAMPLE 15

Application of Product Solution

Prior to the planting of a cotton crop, the urea sulfate-urea product solution of Example 1 was applied to the soil in a field located near Gilbert, Arizona. The pre-application soil pH was approximately 8.2 and soil analysis revealed a nitrogen requirement for cotton growing of approximately 180 pounds per acre.

The product solution of Example 1 was introduced into a metering tank which was in turn connected to the inlet of a centrifugal pump which supplied water under pressure to a sprinkler system for the field. The product solution was metered into the sprinkler water supply at a rate of 1.67 pounds per minute and the resulting water solution of the urea sulfate-urea product was sprayed onto the surface of the field for 12 hours, resulting in an application of 200 pounds of the urea sulfate-urea solution per acre.

The above procedure was repeated at two week intervals during the growth of the cotton crop. The cotton yield was 1600 pounds per acre.

For comparison, a test plot located adjacent the field described above was planted at the same time and received the same amount of water on the same spray schedule described above but it did not receive any application of the urea sulfate-urea solution. The yield of cotton in the test plot was only approximately 1100 pounds per acre.

EXAMPLE 16

The other product solutions of Examples 2-14 can be similarly applied to soils with varying, but substantial, improvements in crop yields.

EXAMPLE 17

A liquid fertilizer containing the nutrient phosphorous, in addition to the nutrients nitrogen and sulfur, is obtained as follows:

super phosphoric acid is ammoniated to form the common grade 10-34-0 ammonium polyphosphate liquid fertilizer, 10-34-0 grade fertilizer is blended with 26-0-0-11

|  |  | lbs. | N | P | K | S |
|---|---|---|---|---|---|---|
| 26-0-0-11 | Urea Sulfate-Urea Product Solution | 69 | 17.94 | 0 | 0 | 7.59 |
| 10-34-0 | Ammoniated Super Phosphoric Acid | 31 | 3.1 | 10.54 | 0 | 0 |
|  |  | 100 | 21.04 | 10.54 | 0 | 7.59 |

EXAMPLE 18

A liquid fertilizer containing the nutrients iron and zinc, in addition to nitrogen and sulfur is obtained as follows:

a solution is prepared by adding iron sulfate and zinc sulfate to water — this solution is ammoniated to form a ferrous hydroxide and zinc hydroxide precipitant. This precipitant is added to and readily dissolved in the 26-O-O-11 solution of Example 1 to provide iron and zinc.

EXAMPLE 19

A liquid fertilizer composition containing the nutrients iron and zinc, in addition to nitrogen, phosphorous and sulfur is obtained as follows:

a solution is prepared by adding iron sulfate and zinc sulfate to water — this solution is ammoniated to form a ferrous hydroxide and zinc hydroxide slurry. This slurry is added to and readily dissolved in the 21-10.5-0-7.6 solution of Example 17, to provide iron and zinc.

The resulting product is a unique solution of nitrogen, phosphate, sulfate, iron and zinc, providing available nutrient advantages (solubility and increased absorption and utilization by plants) due to the sulfate acid media. It also makes the five nutrients available as one fertilizer to be applied at one time instead of 2 or 3 or more applications which would be required if the nutrients were not combined.

While the principles of the invention have now been made clear in illustrated embodiments, there will be immediately obvious to those skilled in the art, many modifications of the proportions and additional nutrients used in the practice of the invention, and otherwise, which are particularly adapted for specific environments and requirements without departing from those principles. The appended claims are therefore intended to cover and embrace any such modifications within the limits only of the true spirit and scope of the invention.

What I claim is:

1. A method for making a liquid nitrogen sulfur fertilizer composition comprising the steps of:
    (a) adding a small quantity of a total predetermined amount of sulfuric acid to a total predetermined amount of urea to cause a reaction therebetween with said quantity of sulfuric acid being sufficient to produce a reaction temperature in the range of from approximately 100° F. to 225° F.;
    (b) blending said quantity of sulfuric acid with said urea during step a to initiate the formation of a reacting molten slurry thereof;
    (c) adding an additional small quantity of said total amount of sulfuric acid to said reacting molten slurry with said additional quantity of sulfuric acid being sufficient to maintain said reaction temperature in the range of from approximately 100° F. to 225° F.;
    (d) blending said additionally added sulfuric acid with said reacting molten slurry during step c; and
    (e) repeating steps c and d sequentially until the total amount of sulfuric acid has been added which achieves a gradual reaction of said sulfuric acid with said urea to form a homogenous fused solution of urea sulfate and urea.

2. The method of claim 1 including the additional step of blending said urea prior to step a while adding a small amount of water thereto with said amount of water being small enough to keep the reaction temperature below approximately 225° F.

3. The method of claim 1 including the additional step of blending said urea prior to step a while adding a small amount of water thereto with said amount of water being small enough to keep the reaction temperature below approximately 200° F.

4. The method of claim 1 including the additional step of adding a small amount of water during step a with the total amounts of water and sulfuric acid added in step a being sufficient to produce a reaction temperature in the range of from approximately 100° F. to 225° F.

5. The method of claim 1 including the additional step of adding a small amount of water during step a with the total amounts of water and sulfuric acid added during step a being sufficient to produce a reaction temperature in the range of from approximately 160° F. to 200° F.

6. The method of claim 1 wherein said quantity of sulfuric acid added during step a is sufficient to produce a reaction temperature in the range of from approximately 160° F. to 200° F.

7. The method of claim 1 wherein said additional quantity of sulfuric acid added during step c is sufficient to maintain the reaction temperature in the range of from approximately 160° F. to 200° F.

8. The method of claim 1 including the additional step of blending said reacting molten slurry after step b without the further addition of sulfuric acid to substantially complete the formation of the reacting molten slurry initiated in step b.

9. The method of claim 1 wherein said urea is in prilled form prior to step a.

10. The method of claim 1 wherein said urea is in powdered form prior to step a.

11. The method of claim 1 including the further step of adding water after step e for dissolution of the homogenous fused solution of urea sulfate and urea to lower the solidification temperature thereof.

12. The method of claim 1 including the further steps of:
   (a) adding water during step a with the total amounts of water and sulfuric acid added during step a being sufficient to produce a reaction temperature in the range of from about 160° F. to 200° F.; and
   (b) adding an additional amount of water after step e with the water added during step a and subsequent to step e causing dissolution of the homogenous fused solution of urea sulfate and urea to reduce the solidification temperature thereof.

13. The method of claim 1 including the further steps of:
   (a) blending said urea prior to step a while adding water thereto with the amount of water being small enough to keep the reaction temperature below 200° F.; and
   (b) adding an additional amount of water after step e with the water added prior to step a and the water added after step e causing dissolution of the homogenous fused solution of urea sulfate and urea to reduce the solidification temperature thereof.

14. The method of claim 1 including the additional step of adding at least one additional nutrient to said homogenous fused solution of urea sulfate and urea.

15. The method of claim 14 wherein said additional nutrient comprises a solution of ammonium phosphate.

16. The method of claim 14 wherein said additional nutrient comprises ferrous hydroxide and zinc hydroxide in solution.

17. The method of claim 14 wherein said additional nutrient comprises ammonium phosphate, ferrous hydroxide and zinc hydroxide in solution.

18. A new composition of matter useful as a one treatment liquid fertilizer consisting of a solution of urea sulfate and urea produced by the process of claim 1.

19. The new composition of claim 18 wherein said solution of urea sulfate and urea has a nitrogen content in the range of from 1% to 37%.

20. The new composition of claim 18 wherein said solution of urea sulfate and urea has a sulfur content in the range of from 1% to 15%.

21. The new composition of claim 18 wherein said solution of urea sulfate and urea has a nitrogen sulfur analysis of 28-0-0-8.

22. The new composition of claim 18 wherein said solution of urea sulfate and urea has a nitrogen sulfur analysis of 29-0-0-9.

23. The new composition of claim 18 wherein said solution of urea sulfate and urea has a nitrogen sulfur analysis of 30-0-0-8.

24. The new composition of claim 18 wherein said solution of urea sulfate and urea has a nitrogen sulfur analysis of 28-0-0-10.

25. The new composition of claim 18 wherein said solution of urea sulfate and urea has a nitrogen sulfur analysis of 26-0-0-11.

26. The new composition of claim 18 wherein said solution of urea sulfate and urea has a nitrogen sulfur analysis of 30-0-0-10.

27. The new composition of claim 18 wherein said solution of urea sulfate and urea has a nitrogen sulfur analysis of 32-0-0-9.

28. The new composition of claim 18 wherein said solution of urea sulfate and urea also contains ammonium phosphate in solution.

29. The new composition of claim 18 wherein said solution of urea sulfate and urea also contains ferrous hydroxide and zinc hydroxide in solution.

30. The new composition of claim 18 wherein said solution of urea sulfate and urea also contains ferrous hydroxide, zinc hydroxide and ammonium phosphate in solution.

* * * * *